H. O. HERRMANN.
CHILD'S GOCART.
APPLICATION FILED MAR. 16, 1921.
1,411,496.
Patented Apr. 4, 1922.
2 SHEETS—SHEET 2.
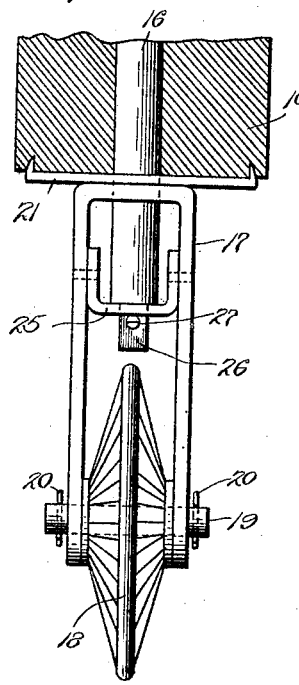
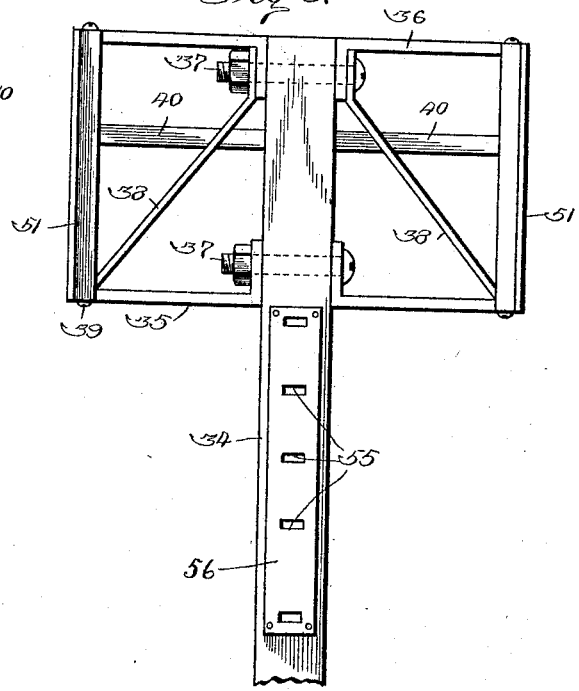
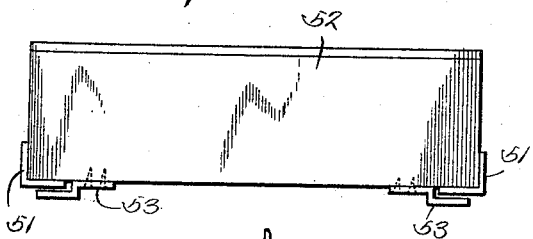
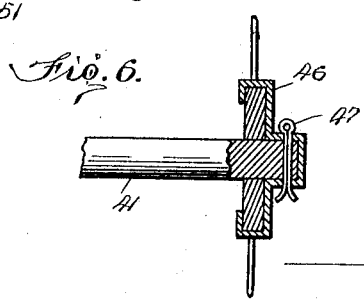
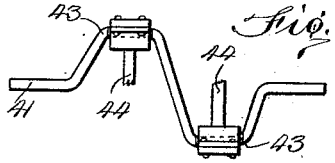
Hugo O. Herrmann, INVENTOR.
BY Watson E. Coleman
ATTORNEY.

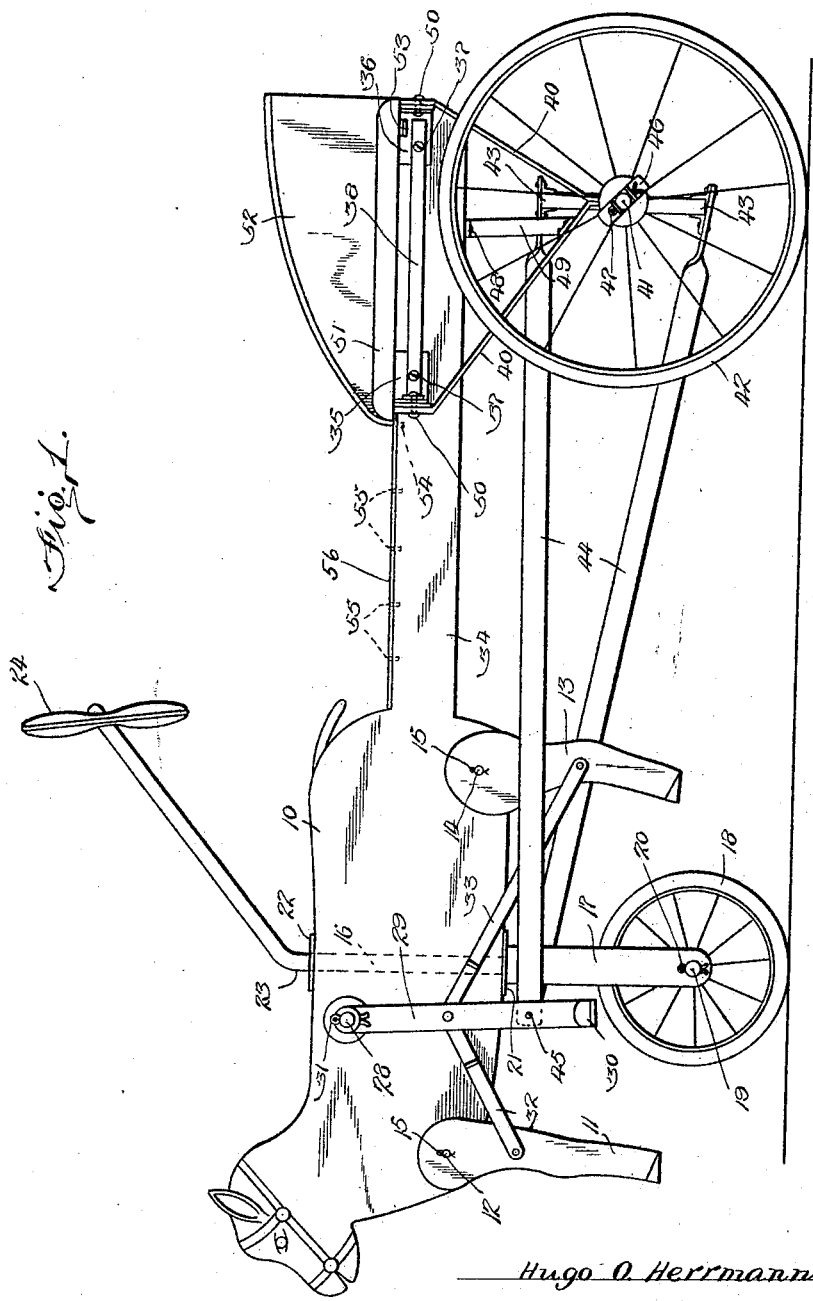

UNITED STATES PATENT OFFICE.

HUGO O. HERRMANN, OF CINCINNATI, OHIO.

CHILD'S GOCART.

1,411,496.  Specification of Letters Patent.  Patented Apr. 4, 1922.

Application filed March 16, 1921. Serial No. 452,851.

*To all whom it may concern:*

Be it known that I, HUGO O. HERRMANN, a citizen of the United States, residing at Cincinnati, in the county of Hamilton and State of Ohio, have invented certain new and useful Improvements in Children's Gocarts, of which the following is a specification, reference being had to the accompanying drawings.

This invention relates to carts, and particularly to go-carts of that character wherein the figure of an animal is mounted in front of the cart apparently drawing the cart, the cart being propelled by the child.

The object of this invention is to provide an improved cart of this character which shall be attractive and interesting, in which the animal's legs are moved as the cart moves, and in which the cart is propelled by cranks connected to the traction wheel of the cart.

A further object is to provide a construction of this character in which the figure of the animal is connected to the cart, not by shafts but by a single integral bar which is rigidly connected or formed as part of the figure of the animal and which forms part of the frame of the cart, thus making the cart particularly strong and making it easy for a child to get into or out of the seat of the cart.

A still further object is to make the seat of the cart readily adjustable along the supporting frame so as to bring the seat nearer to or further from the pedals whereby the cart is driven.

Other objects have to do with the details of construction and arrangement of parts whereby a particularly strong and serviceable cart is provided.

My invention is illustrated in the accompanying drawings, wherein:—

Figure 1 is a side elevation of a child's cart constructed in accordance with my invention;

Figure 2 is a fragmentary vertical sectional view through the body 10, showing the steering wheel and its shaft in elevation;

Figure 3 is a fragmentary top plan view of the rear portion of the body;

Figure 4 is a rear elevation of the seat and its attaching means;

Figure 5 is a side elevation of the seat detached;

Figure 6 is a fragmentary sectional view through one of the wheel hubs showing the manner in which the wheels are held in place on the axles and have driving engagement therewith;

Figure 7 is a fragmentary view of the crank shaft 41.

In the drawings, I have illustrated the animal apparently drawing the cart as being a goat or kid, though I do not wish to be limited to this, this draft animal being designated 10. The figure of the draft animal may be made out of wood or any other suitable material and either stuffed or covered with the skin of the animal. The fore legs 11 are pivoted at 12 to the body of the animal, while the hind legs 13 are pivoted at 14 to the body of the animal, these pivots being preferably such that the legs may be withdrawn from the pivots by removing the cotter pins 15 from the extremities of the pivot pins. The body of the animal is supported by means of a steering wheel consisting of a rod 16 extending downward through the body of the animal and at its lower end attached to a fork 17 between which the wheel 18 is operatively mounted, this wheel being mounted upon an axle 19 having cotter pins 20 whereby it is held in place in the fork.

The rod or steering shaft 16 is provided at its junction with the fork with a washer 21 which bears against the under face of the body 10, while a corresponding washer 22 rests upon the top of the body. This shaft 16 is angularly bent, as at 23, and provided with a handle 24 whereby it may be operated. By reference to Figure 2, it will be seen that the fork 17 is braced by means of a channel-shaped cross brace 25 riveted to the arms of the fork. This brace has a square hole for the passage of the squared end 26 of the steering shaft 16, the steering shaft being held from removal by means of a cotter pin 27 passing through this squared portion of the shaft.

Extending through the body 10 is a pin 28 whose extremities are reduced, and mounted upon these extremities are the depending, freely swinging, operating pedals 29, the lower ends of which are angularly bent, as at 30, to form foot rests. These pedals are held in place by cotter pins 31 so that they may be readily removed and the pin 28 driven out if desired. The pin preferably operates through a flanged bushing forming a bearing for the pin and wear plates against which the pedals 29 operate. Each of the pedals 29 is connected by links 32 and 33 to the front and rear legs 11 and 13 respectively so that as these pedals are oscillated by the child, the legs 11 and 13 will also oscillate.

Preferably forming part of the body 10 and extending rearward therefrom is a bar 34, which at its rear end has bolted to it the angular frame bars 35 and 36 by transverse bolts 37, these frame bars being formed with angular feet through which the bolts pass. There are two of these frames extending laterally in opposite directions from the bar 34 and bolted thereto, as before described, and each of these frames is braced by a diagonally disposed frame bar 38, each being angularly bent at its inner end to fit against the angular feet of the frame bars 35 and 36 and be bolted thereto by the bolts 39.

Attached to the front and rear portions of the frames 35 and 36 are the downwardly converging braces 40, which at their lower ends are formed to provide a bearing for the transverse rear axle 41, upon the ends of which the wheels 42 are mounted. This axle 41 is cranked, as at 43, and on these cranks are mounted the connecting rods 44 which extend forward and are pivotally connected to the pedals 29, at 45. Obviously, therefore, an oscillation of the pedals will cause a rotation of the axle and the rotation of the wheels 42 mounted thereon. The wheels 42 are held to the axle 41 by means of diagonally extending clips 46 (see Figure 6) which are bent to embrace the hub of the wheel between the spokes thereof and to embrace the projecting end of the axle and are held for rotation to the axle by means of transverse cotter pins 47. I do not wish to be limited, obviously, to this particular mounting of the wheels upon the axle but this mounting permits the ready detachment of the wheels in case of necessity.

Extending transversely across the seat supporting frames 35 and 36 below the same is a brace 48 having depending legs 49 which are riveted to the forward braces 40. The forward and rear braces 40 extend upward and outward, as before explained, and are held to the frames 35 and 36 by bolts 50.

Forming part of the frames 35 and 36 are the end bars 51 which are angular in cross section, as illustrated in Figure 4, and slidingly supported by these angular end members 51 is the seat 52. This seat may be of any usual or suitable form but is preferably made of black sheet iron or some relatively like material. The seat is held in sliding engagement with the body frame by means of angularly bent strips 53 which are attached to the bottom of the seat on each side thereof and extend laterally outward and are offset so as to engage beneath the lower flanges of the angle iron 51. Thus the seat is permitted to have longitudinal movement. There are two of these strips 53 and these are disposed at the rear end of the seat, but the forward end of the seat is not held to the body of the sulky frame by strips 53 but the forward end of the seat is provided with a downwardly extending tooth 54 which engages in slots 55 formed in a metallic plate 56 mounted upon the upper face of the longitudinally extending bar 34. Thus it will be seen that the forward end of the seat may be raised so as to detach the tooth 54 from its engagement with the slot 55 and then the seat may be shifted longitudinally upon the angle irons 51 so as to suitably adjust the seat with reference to the pedals, and then the forward end of the seat may be depressed to engage the tooth 54 with one of the slots 55 so as to again lock the seat in adjusted position. This construction permits of a ready adjustment of the seat so that the cart may be adapted to children of different ages and sizes and at the same time holds the seat firmly in place but permits the detachment of the seat when desired.

Preferably the animal body 10 will be made of wood about 1⅜" thick painted or, as before remarked, covered with an animal skin, and preferably the legs 12 and 13 will be of thin sheet metal painted to correspond with the body. The wheels may be either wire wheels or wooden wheels and either rubber tired or metal tired as desired.

It will be obvious that a cart constructed as described is extremely light but strong. This is particularly due to the fact that the body of the animal supposed to be drawing the cart is formed integral or rigidly connected to a rearwardly extending, longitudinal bar 34 which extends beneath the seat and which is connected to the wheel engaging braces. Heretofore in carts of this character, as far as known to me, the animal supposed to be drawing the cart has been disposed between shafts, and this has not only rendered the cart liable to breakage and structurally weak, but has rendered it difficult for a child to climb into or out of the cart. Where there are shafts on the sulky which engage the animal, then when a child tries to get into the cart it has to step over one shaft and in between the shafts, and when the child desires to get out of the cart in a hurry, it is necessary to raise both feet out of the sulky and put them over one of the shafts and as a consequence is very liable to trip and fall. With my construction, the sulky or cart portion proper is rigidly bolted onto the wooden bar that extends from the animal, leaving an unimpeded space on both sides of this bar and all the child has to do is to put one foot over the bar and he is out of the sulky. The position of the pedals in my construction gives a better leg movement than is possible with the pedals as arranged in carts of this character as ordinarily constructed, and furthermore the adjustable seat permits the child to secure the best possible position for operating the pedals. Again, the adjustable seat which I have devised does not have to be locked in place by bolts, but may be readily set and adjusted at any time.

While I have illustrated a form of my invention which I believe to be particularly effective, it is obvious that I do not wish to be limited thereto, as many changes might be made in the details of construction and arrangement of parts without departing from the spirit of the invention as defined in the appended claims.

I claim:—

1. A toy cart of the character described comprising rear wheels, a front steering wheel, an animal body supported by the front steering wheel, the body being extended rearward to form a single rigid bar extending over the rear wheels, a seat supporting frame formed in two sections bolted on each side of the supporting bar and extending laterally therefrom, operative connections from said seat supporting frame to the rear supporting wheels, and a seat mounted upon said frame and slidably adjustable along the frame and over said longitudinally extending bar.

2. A child's cart of the character described comprising a rear cranked axle, rear driving wheels mounted thereon, a seat supporting frame operatively supported upon the rear driving axle and above the same, an animal figure disposed in advance of the rear wheels, a bar rigidly connecting the animal figure to the seat supporting frame, depending pedals swingingly mounted upon the animal figure, operative connections between said pedals and the cranked axle, a pair of legs swingingly mounted upon the forward and rear portions of the animal figure, the pedals being disposed between said legs and on each side of the animal figure, and links operatively connecting the pedals to the legs.

3. In a child's cart of the character described, rear wheels, a seat supporting frame operatively mounted thereon, an animal figure disposed in advance of the rear wheels and having a single rigid bar extending rearwardly therefrom and rigidly connected to the seat supporting frame, and a seat mounted upon the seat supporting frame and said bar and having longitudinal movement along said bar, the rear end of the seat being interlocked with the seat supporting frame and the forward end of the seat being provided with a latching member, said rigid bar being formed at intervals with means for engaging said latching member to thereby hold the seat in longitudinally adjusted positions.

4. In a child's cart of the character described, rear wheels, a seat supporting frame operatively mounted thereon, an animal figure disposed in advance of the rear wheels and having a single rigid bar extending rearwardly therefrom and rigidly connected to the seat supporting frame, and a seat mounted upon the seat supporting frame and said bar and having longitudinal movement along said bar, the rear end of the seat being interlocked with the seat supporting frame and the seat being provided at its forward end with a depending tooth and the rigid bar being provided with recesses at intervals with which said tooth is adapted to engage to thereby hold the seat in its longitudinally adjusted position.

5. In a child's cart of the character described, rear wheels, a seat supporting frame operatively mounted thereon, an animal figure disposed in advance of the rear wheels and having a single rigid bar extending rearwardly therefrom and rigidly connected to the seat supporting frame, and a seat mounted upon the seat supporting frame and said bar and having longitudinal movement along said bar, said seat supporting frame having angle irons formed with laterally projecting flanges at its ends and the seat having at its rear end laterally projecting angular strips adapted to engage beneath the flanges of the angle irons and have sliding engagement therewith, the forward end of the seat having a depending tooth, and a longitudinally extending bar having recesses at intervals with which said tooth engages.

6. In a child's cart of the character described, rear wheels, a seat supporting frame operatively mounted thereon, an animal figure disposed in advance of the rear wheels and having a single rigid bar extending rearwardly therefrom and rigidly connected to the seat supporting frame, a seat mounted upon the seat supporting frame and said bar and having longitudinal movement along said bar, said seat supporting frame having angle irons formed with laterally projecting flanges at its ends and the seat having at its rear end laterally projecting angular strips adapted to engage beneath the flanges of the angle irons and have sliding engagement therewith, the forward end of the seat having a depending tooth, and a longitudinally extending bar having upon its upper face a longitudinally extending, metallic plate formed with slots at intervals with which said tooth is adapted to engage.

In testimony whereof I hereunto affix my signature.

HUGO O. HERRMANN.